US012583129B2

(12) United States Patent
Tanaami et al.

(10) Patent No.: US 12,583,129 B2
(45) Date of Patent: Mar. 24, 2026

(54) TORQUE SENSOR AND ROBOT

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 356 days.

(21) Appl. No.: 18/494,276

(22) Filed: Oct. 25, 2023

(65) Prior Publication Data

US 2024/0157574 A1     May 16, 2024

(30) Foreign Application Priority Data

Nov. 15, 2022    (JP) ................................. 2022-182857

(51) Int. Cl.
*G01L 3/10*          (2006.01)
*B25J 13/08*         (2006.01)

(52) U.S. Cl.
CPC ............. *B25J 13/085* (2013.01); *G01L 3/108* (2013.01)

(58) Field of Classification Search
CPC ......... B25J 13/085; B25J 19/02; G01L 3/108; G01L 1/2287; G01L 3/145; G01L 3/00; G01L 3/10; G01L 5/226
See application file for complete search history.

(56) References Cited

U.S. PATENT DOCUMENTS

| | | | | |
|---|---|---|---|---|
| 8,904,884 B2 * | 12/2014 | Kim | .......................... | G01L 3/02 |
| | | | | 73/862.338 |
| 10,422,707 B2 * | 9/2019 | Bradford | ................ | B25J 13/085 |
| 11,085,838 B2 * | 8/2021 | Glusiec | .................. | G01L 1/2206 |
| 11,085,839 B2 * | 8/2021 | Suzuki | ..................... | B25J 19/02 |
| 11,781,927 B2 * | 10/2023 | Hoshino | .............. | G01L 5/0076 |
| | | | | 73/862.338 |
| 2013/0139615 A1 * | 6/2013 | Kwom | .................. | G01L 5/1627 |
| | | | | 156/196 |
| 2014/0144252 A1 * | 5/2014 | Kim | .......................... | G01L 1/26 |
| | | | | 73/862.338 |
| 2018/0292277 A1 * | 10/2018 | Nakayama | ............. | B25J 13/085 |
| 2020/0400515 A1 * | 12/2020 | Endo | ........................ | G01L 3/108 |
| 2023/0010885 A1 * | 1/2023 | Miyashita | ............... | G01L 3/108 |
| 2023/0106198 A1 * | 4/2023 | Faye | ....................... | G01L 3/108 |
| | | | | 73/862.338 |

FOREIGN PATENT DOCUMENTS

JP          2022-73177 A      5/2022

* cited by examiner

*Primary Examiner* — Freddie Kirkland, III
(74) *Attorney, Agent, or Firm* — Harness, Dickey & Pierce, P.L.C.

(57)          ABSTRACT
A torque sensor is provided that achieves miniaturization and that has a high degree of freedom in design of resolution. The torque sensor includes: a first plate-like member including a spacer that is plate-like; and a second plate-like member fastened to the first plate-like member. In an outer circumferential region of the second plate-like member outside the spacer, a film-shaped strain gauge disposed in a recess that is provided on an outer edge of the spacer, and a film-shaped wire connected to the film-shaped strain gauge are provided.

6 Claims, 4 Drawing Sheets

TORQUE SENSOR AND ROBOT

This Nonprovisional application claims priority under U.S.C. § 119 on Patent Application No. 2022-182857 filed in Japan on Nov. 15, 2022, the entire contents of which are hereby incorporated by reference.

TECHNICAL FIELD

The present invention relates to a torque sensor and a robot.

BACKGROUND ART

Torque sensors are used in various industrial fields, and are used to, for example, determine an operation of an industrial robot. As such a torque sensor, a flange-type torque sensor is known that enables design of load-bearing specifications by adjusting the number of stacks of prede- termined parts that have been standardized (for example, see Patent Literature 1).

CITATION LIST

Patent Literature

Patent Literature 1

Japanese Patent Application Publication Tokukai No. 2022-73177

SUMMARY OF INVENTION

Technical Problem

A torque sensor is required to have a size and resolution suitable for application thereof. However, such a conven- tional technique as described earlier has various problems.

For example, a rotary torque sensor of a flange-type commonly has a large size. A size of a strain gauge may make it impossible to reduce appearance of the rotary torque sensor. Installation of wiring (lead wires) from the strain gauge to a substrate may also make it impossible to reduce appearance of the rotary torque sensor. Installation of the strain gauge and the wiring may also make it impossible to reduce a thickness of the rotary torque sensor. According to a capacitive torque sensor, an external force is measured from a gap between upper and lower substrates. This may limit a thickness of the capacitive torque sensor to not less than a certain level. Furthermore, a range of resolution is determined by a material property of a strain element of a torque sensor and a characteristic of a strain gauge. This may restrict a combination of the material property of the strain element and the strain gauge. A conventional torque sensor thus leaves room for consideration from the viewpoints of miniaturization and a degree of freedom in design of reso- lution.

An aspect of the present invention has an object to provide a torque sensor that achieves miniaturization and that has a high degree of freedom in design of resolution.

Solution to Problem

In order to attain the object, a torque sensor in accordance with an aspect of the present invention includes: a first plate-like member; a second plate-like member that is opposed to the first plate-like member; and a spacer that is integrated with the first plate-like member and that is fastened to the second plate-like member, the spacer being plate-like, wherein a recess is provided on an outer edge of the spacer, and at least one film-shaped strain gauge dis- posed in the recess and a film-shaped wire connected to the at least one film-shaped strain gauge are provided in an outer circumferential region of a main surface of the second plate-like member, the main surface being opposed to the first plate-like member, the outer circumferential region protruding from the spacer.

Advantageous Effects of Invention

An aspect of the present invention makes it possible to provide a torque sensor that achieves miniaturization and that has a high degree of freedom in design of resolution.

DESCRIPTION OF EMBODIMENTS

The following description specifically discusses an embodiment of the present invention.

Figure 1:
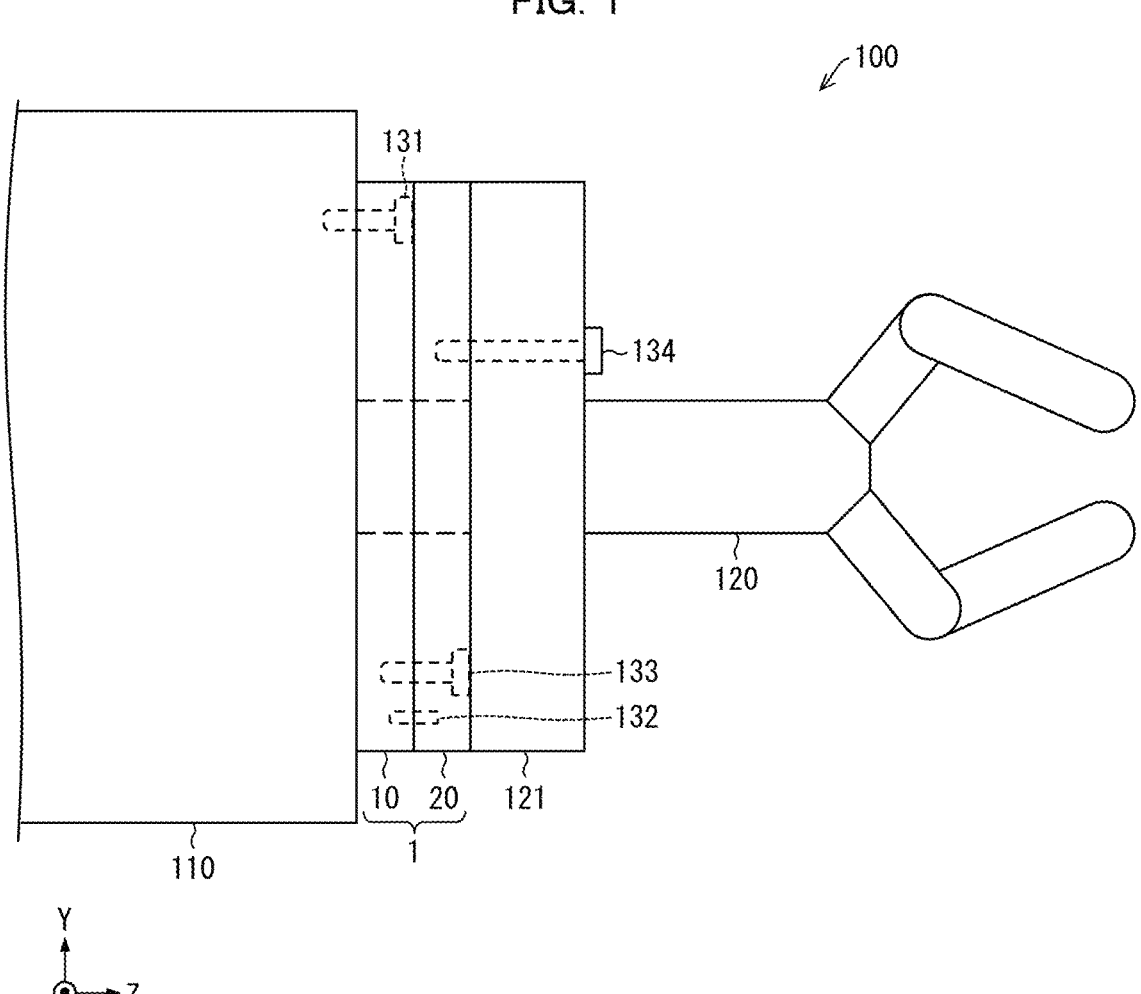
FIG. 1 is a diagram schematically illustrating a configu- ration of a robot in accordance with an embodiment of the present invention.

FIG. 1 is a diagram schematically illustrating a configu- ration of a robot in accordance with an embodiment of the present invention. As illustrated in FIG. 1, a robot 100 includes, in a Z-axis direction, a robot arm 110, a torque sensor 1 fixed to the robot arm 110, and a robot hand 120 fixed to the torque sensor 1. The robot hand 120 is fixed to an attachment plate 121.

Figure 2:
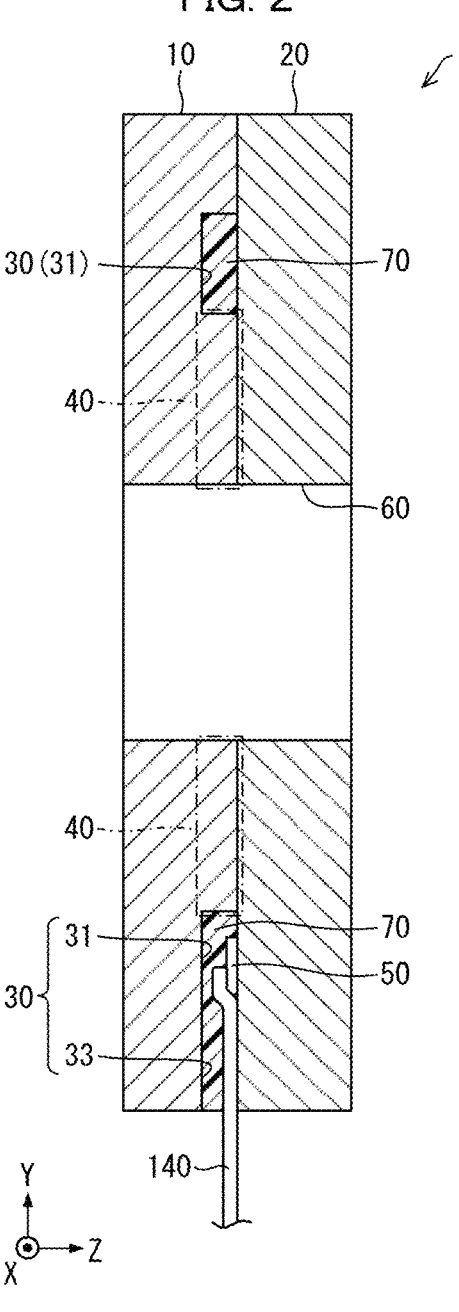
FIG. 2 is a diagram schematically illustrating a structure of a cross section of a torque sensor in accordance with an embodiment of the present invention.
Figure 3:
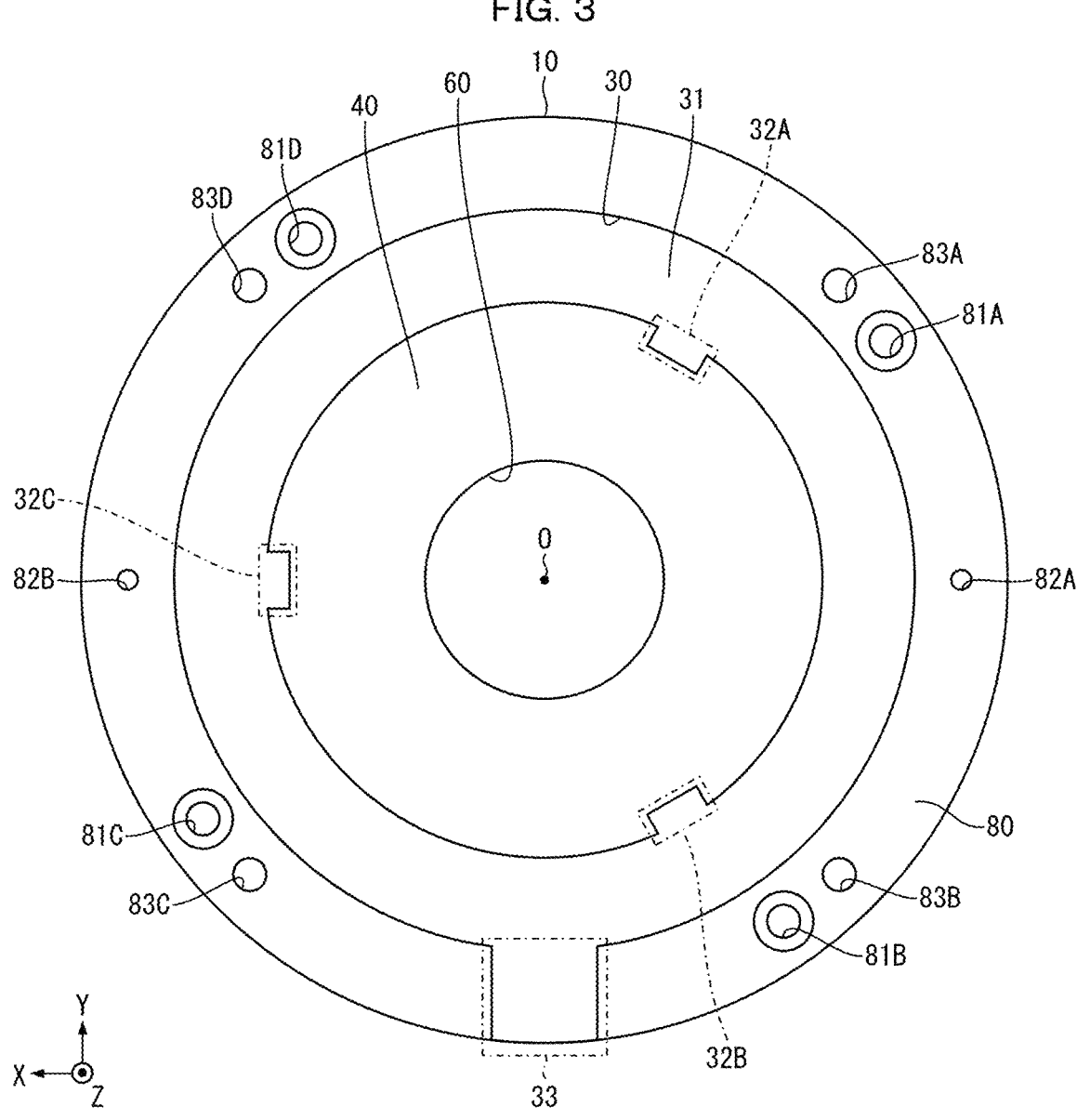
FIG. 3 is a diagram schematically illustrating a structure of a main surface of a first plate-like member of the torque sensor in accordance with an embodiment of the present invention, the main surface being opposed to a second plate-like member of the torque sensor.
Figure 4:
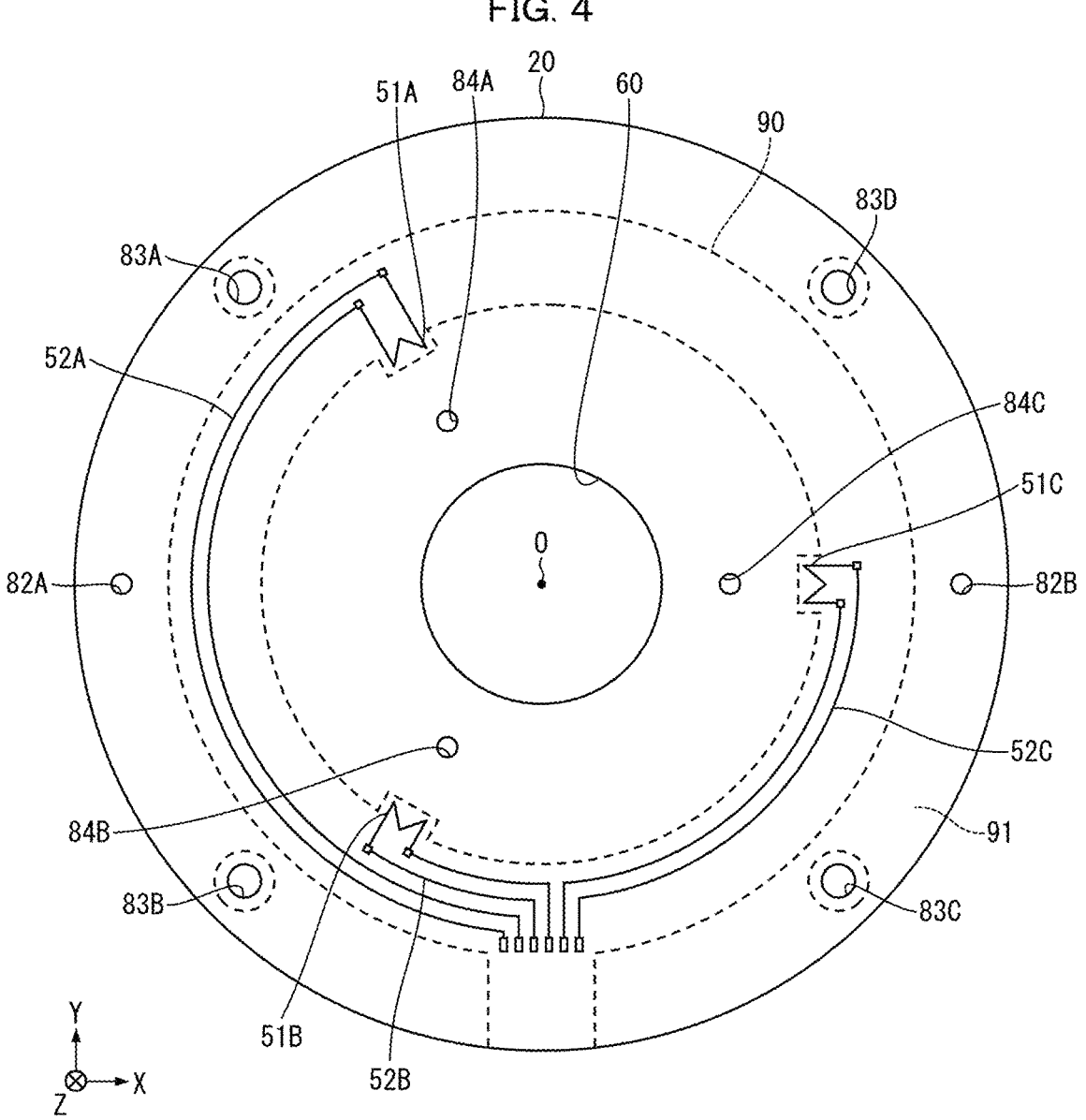
FIG. 4 is a diagram schematically illustrating a structure of a main surface of the second plate-like member of the torque sensor in accordance with an embodiment of the present invention, the main surface being opposed to the first plate-like member.

The torque sensor 1 includes a first plate-like member 10 and a second plate-like member 20 that is opposed to the first plate-like member 10. FIG. 2 is a diagram schematically illustrating a structure of a cross section of the torque sensor 1 in accordance with an embodiment of the present inven- tion. FIG. 3 is a diagram schematically illustrating a struc- ture of a main surface of the first plate-like member 10 of the torque sensor 1 in accordance with an embodiment of the present invention, the main surface being opposed to the second plate-like member 20. FIG. 4 is a diagram schemati- cally illustrating a structure of a main surface of the second plate-like member 20 of the torque sensor 1 in accordance with an embodiment of the present invention, the main surface being opposed to the first plate-like member 10. "Opposed main surfaces" of the first plate-like member and the second plate-like member are hereinafter also merely referred to as "opposed surfaces". Furthermore, a shape viewed from above is merely referred to as a "planar shape".

As illustrated in FIG. 2, the torque sensor 1 is configured such that the first plate-like member 10 and the second plate-like member 20 are combined so as to be opposed to each other. The first plate-like member 10 and the second plate-like member 20 are each made of a material that is selected as appropriate in a range in which strain is generated by an external force around a Z-axis and that is, for example, stainless steel. As illustrated in FIGS. 3 and 4, the first plate-like member 10 and the second plate-like member 20 are each a plate-like member that has a planar annular shape, and each have a center part having a circular through hole 60.

The first plate-like member 10 has a groove 30 on an opposed surface thereof. The groove 30 has a rectangular cross section. The groove 30 has a depth that can be set as appropriate in a range greater than a sum of a thickness of a printed wire (described later) and a thickness of a flexible substrate 140, and that is, for example, not more than 0.1 μm.

The groove 30 includes an annular part 31 that is provided circumferentially between an inner peripheral edge and an outer peripheral edge of the first plate-like member 10, three recesses 32A, 32B, and 32C that extend further inward from an inner peripheral edge of the annular part 31, and a contact part 33 that extends radially outward from an outer peripheral edge of the annular part 31 so as to cause the annular part 31 to communicate with an outside. The annular part 31, the recesses 32A, 32B, and 32C, and the contact part 33 form a planar shape of the groove 30. The recesses 32A, 32B, and 32C are disposed so as to be equidistant from a center O of a planar shape of the first plate-like member 10, and are disposed circumferentially at regular intervals. The recesses 32A, 32B, and 32C each have a planar rectangular shape.

On an inner circumference side of the groove 30 of the first plate-like member 10, a spacer 40 is provided that is plate-like and that has a planar shape which is substantially annular. In the torque sensor 1, the spacer 40 is thus integrated with the first plate-like member 10. That is, the spacer 40 is a part of the first plate-like member 10.

On an outer circumference side of the groove 30 of the first plate-like member 10, an outer edge part 80 is provided that has a planar shape which is substantially annular. The planar shape of the outer edge part 80 is a C shape having an annular ring cut out by the contact part 33. The outer edge part 80 is provided with holes through which the first plate-like member 10 and the second plate-like member 20 are to be fastened to each other. Specifically, the holes are four apertures 81A, 81B, 81C, and 81D, two holes 82A and 82B, and four holes 83A, 83B, 83C, and 83D.

The apertures 81A, 81B, 81C, and 81D are countersunk apertures through which respective screws 131 are to be inserted by the screws 131 being screwed into the respective countersunk apertures. The apertures 81A, 81B, 81C, and 81D are disposed so as to be equidistant from the center O of the planar shape of the first plate-like member 10, and are disposed circumferentially at regular intervals.

The holes 82A and 82B are holes into which respective pins 132 are to be inserted. The holes 82A and 82B are also disposed so as to be equidistant from the center O of the planar shape of the first plate-like member 10, and are also disposed circumferentially at regular intervals.

The holes 83A, 83B, 83C, and 83D are screw holes into which respective screws 133 are to be screwed. The holes 83A, 83B, 83C, and 83D are also disposed so as to be equidistant from the center O of the planar shape of the first plate-like member 10, and are also disposed circumferentially at regular intervals.

Note that the recess 32C is disposed coaxially (on an X-axis) with the hole 82B when viewed from above. In addition, the aperture 81C is disposed on a straight line that intersects with the X-axis at the center O at a specific angle a1. The aperture 83C is located on the straight line that intersects with the X-axis at the center O at a specific angle A2.

The second plate-like member 20 has an outer circumferential region 90 on an opposed surface thereof. The outer circumferential region 90 is a part of the opposed surface of the second plate-like member 20, the part protruding from the spacer 40. More specifically, the outer circumferential region 90 is a part of the opposed surface of the second plate-like member 20, the part being opposed to the groove 30 when the second plate-like member 20 is opposed to the first plate-like member 10. Alternatively, it can be said that the outer circumferential region 90 is a part of the opposed surface of the second plate-like member 20, the part being unopposed to the spacer 40 and the outer edge part 80 when the second plate-like member 20 is opposed to the first plate-like member 10.

The second plate-like member 20 has a printed wire 50 in the outer circumferential region 90. The printed wire 50 includes three film-shaped strain gauges 51A, 51B, and 51C, and film-shaped wires 52A, 52B, and 52C that are connected to the respective film-shaped strain gauges 51A, 51B, and 51C.

The printed wire 50 is constituted by, for example, a base layer, a wiring layer, and an overcoat layer. The base layer (insulating layer) is, for example, a layer of silica ($SiO_2$). The base layer is formed so as to have a slightly greater width than the wiring layer. The wiring layer is constituted by the film-shaped strain gauges 51A, 51B, and 51C, and the film-shaped wires 52A, 52B, and 52C. The film-shaped strain gauges 51A, 51B, and 51C are each formed of a thin layer of chromium nitride (NCr). The overcoat layer is, for example, a polyimide layer. As in the case of the base layer, the overcoat layer is also formed so as to have a slightly greater width than the wiring layer.

At least a gauge part of the film-shaped strain gauge 51A is formed in a rectangular part corresponding to the recess 32A. Thus, in the torque sensor 1, at least the gauge part of the film-shaped strain gauge 51A is disposed in the recess 32A. Similarly, at least gauge parts of the film-shaped strain gauges 51B and 51C are disposed in the respective recesses 32B and 32C. The film-shaped wires 52A, 52B, and 52C are each formed of a thin layer of copper (Cu). Inorganic layers described earlier (the base layer and the wiring layer) are produced by, for example, sputtering.

The film-shaped wires 52A, 52B, and 52C are connected at respective one ends thereof so as to correspond to the respective film-shaped strain gauges 51A, 51B, and 51C. The film-shaped wires 52A, 52B, and 52C each extend through the outer circumferential region 90 to a part that is adjacent to a part of the outer circumferential region 90, the part corresponding to the contact part 33. The film-shaped wires 52A, 52B, and 52C have respective other ends that are arranged in a row in the outer circumferential region 90.

The second plate-like member 20 has three screw apertures 84A, 84B, and 84C in a substantially annular part between an inner peripheral edge of the opposed surface and an inner peripheral edge of the outer circumferential region 90. The screw apertures 84A, 84B, and 84C are apertures into which respective screws 134 are to be screwed. The screw apertures 84A, 84B, and 84C are disposed so as to be equidistant from the center O of the planar shape of the second plate-like member 20, and are disposed circumferentially at regular intervals. The screw apertures 84A, 84B, and 84C are disposed on a circumference having a smaller diameter than a circumference whose center corresponds to the center O and on which the holes 82A and 82B and the holes 83A, 83B, 83C, and 83D are disposed. The screw aperture 84A is disposed coaxially with the rectangular part corresponding to the recess 32A in a radial direction. Similarly, the screw aperture 84B is disposed coaxially with a rectangular part corresponding to the recess 32B in the radial direction. The screw aperture 84C is disposed coaxially with a rectangular part corresponding to the recess 32C in the radial direction.

On an outer circumference side of the outer circumferential region 90 of the second plate-like member 20, an outer edge region 91 is provided that has a planar shape which is substantially annular. The outer edge region 91 is a region that is opposed to the outer edge part 80 of the first plate-like member 10. The planar shape of the outer edge region 91 is a C shape having an annular ring cut out by a region of the first plate-like member 10, the region being opposed to the contact part 33. The outer edge region 91 is provided with holes through which the first plate-like member 10 and the second plate-like member 20 are to be fastened to each other. Specifically, the holes are two holes 82A and 82B, and four holes 83A, 83B, 83C, and 83D. The holes 82A and 82B, and the holes 83A, 83B, 83C, and 83D are formed at positions opposed to the holes 82A and 82B, and the holes 83A, 83B, 83C, and 83D of the first plate-like member 10. The holes 82A and 82B are holes through which the respective pins 132 are to be inserted, and are disposed so as to be equidistant from the center O of the planar shape of the second plate-like member 20, and are also disposed circumferentially at regular intervals. The apertures 83A, 83B, 83C, and 83D are screw holes into which the respective screws 133 are to be screwed, and are disposed so as to be equidistant from the center O of the planar shape of the second plate-like member 20, and are also disposed circumferentially at regular intervals. The apertures 83A, 83B, 83C, and 83D of the second plate-like member 20 are each a countersunk aperture.

As illustrated in FIG. 2, the first plate-like member 10 is fixed to the robot arm 110 by screwing the screws 131 from the first plate-like member 10 side into the respective apertures 81A, 81B, 81C, and 81D. The second plate-like member 20 is fixed to the first plate-like member 10 by inserting the pins 132 into the respective holes 82A and 82B and by screwing the screws 133 from the second plate-like member 20 side into the respective apertures 83A, 83B, 83C, and 83D. By screwing the screws 133, the second plate-like member 20 is fastened to the first plate-like member 10 and is also fastened to the spacer 40. The robot hand 120 is fixed to the second plate-like member 20 by fastening the attachment plate 121 with the screws 134 from the robot hand 120 side to the respective screw apertures 84A, 84B, and 84C.

The screws 133 thus serve as fastening tools for fastening the spacer 40 to the second plate-like member 20. Furthermore, the pins 132 serve as fixing tools for aligning the first plate-like member 10 with the second plate-like member 20. In the torque sensor 1, the above-described fastening tools are disposed on a circumference whose center corresponds to the center O of the planar shape of each of the first plate-like member 10 and the second plate-like member 20.

Further, respective gauge parts of the film-shaped strain gauges 51A, 51B, and 51C are disposed in the respective recesses 32A, 32B, and 32C. Thus, the film-shaped strain gauges 51A, 51B, and 51C are disposed on a circumference whose center corresponds to the center O, and are also disposed at regular intervals on the circumference.

The flexible substrate 140 is connected to respective other ends of the film-shaped wires 52A, 52B, and 52C of the printed wire 50 of the torque sensor 1. The flexible substrate 140 is connected by, for example, disposing anisotropic electrically conductive particles in a connection part of the flexible substrate 140, the connection part connecting to the respective other ends of the film-shaped wires 52A, 52B, and 52C, and pressure-bonding the connection part to the respective other ends of the film-shaped wires 52A, 52B, and 52C. The flexible substrate 140 extends from a gap between the contact part 33 of the first plate-like member 10 and the opposed surface of the second plate-like member 20 to an outside of the torque sensor 1, and is connected to, for example, bridge circuits including the respective film-shaped strain gauges 51A, 51B, and 51C.

The groove 30 includes the recesses 32A, 32B, and 32C, the annular part 31, and the contact part 33, and forms a gap between the groove 30 and the outer circumferential region 90 on the opposed surface of the second plate-like member 20. In the outer circumferential region 90, the film-shaped wires 52A, 52B, and 52C are disposed as described earlier. The gap, which includes the contact part 33, serves as a communication part that causes the recesses 32A, 32B, and 32C to communicate with an outside on a lateral side of the torque sensor 1. In the communication part, the film-shaped wires 52A, 52B, and 52C are disposed.

The communication part and the recesses 32A, 32B, and 32C that are connected to the communication part are filled with a sealing material 70. The sealing material 70 is a known sealing material having water resistance, and is, for example, an epoxy resin. The sealing material 70 may be filled in the annular part 31 after the flexible substrate 140 is connected to the printed wire 50 and before the first plate-like member 10 is aligned with the second plate-like member. Alternatively, the sealing material 70 may be injected through an opening on an outer circumferential surface of the torque sensor 1, the opening being formed by the contact part 33 after the first plate-like member 10 is aligned with the second plate-like member. The recesses 32A, 32B, and 32C are thus filled with the sealing material 70, and the film-shaped strain gauges 51A, 51B, and 51C are sealed with the sealing material 70. This prevents entry of foreign matter into the communication part and contact of the film-shaped strain gauges 51A, 51B, and 51C with foreign matter.

In a case where the external force around the Z-axis is transferred from the robot hand 120 to the torque sensor 1, the external force is transmitted from the screw 134 to the second plate-like member 20, so that the second plate-like member 20 is under strain. The external force around the Z-axis (torque) is detected by a change in resistance of the film-shaped strain gauges 51A, 51B, and 51C to which the strain has been transferred.

The torque sensor 1 can be directly fixed between the robot arm 110 and the robot hand 120. This allows the torque sensor 1 to have a compact configuration.

The torque sensor 1 includes the spacer 40, and a region protruding from the spacer 40 is a gap having (i) the planar shape of the groove 30, which is formed by the annular part 31, the recesses 32A, 32B, and 32C, and the contact part 33, and (ii) the depth of the groove 30. The present embodiment, in which the film-shaped strain gauges 51A, 51B, and 51C, and the film-shaped wires 52A, 52B, and 52C are employed, makes it possible to dispose a strain gauge and a wire in the gap. Thus, the strain gauge and the wire are disposed between the plate-like members so as to be protected.

The torque sensor 1 includes the film-shaped strain gauges 51A, 51B, and 51C. The torque sensor 1 thus includes a strain gauge on which a film is formed. This enables the torque sensor 1 to be made smaller and thinner.

Furthermore, the torque sensor 1 includes the film-shaped wires 52A, 52B, and 52C. This enables a narrower pitch between the wires. Thus, the torque sensor 1 enables a space required for wiring to be smaller and thinner.

Moreover, the torque sensor 1 achieves resolution of strain detection in accordance with a material property of the first plate-like member 10 and a material of the second plate-like member 20. Further, the film-shaped strain gauges 51A, 51B, and 51C, which are made of NCr, achieve a high gauge factor. This allows the torque sensor 1 to have high resolution. For example, the film-shaped strain gauges 51A, 51B, and 51C achieve a gauge factor that is approximately 5 times higher than a gauge factor of a film-shaped strain gauge made of nickel copper (NiCu).

The torque sensor 1 thus makes it possible to provide a torque sensor that achieves miniaturization and that has a high degree of freedom in design of resolution.

In the torque sensor 1, the film-shaped strain gauges 51A, 51B, and 51C are disposed at regular intervals on a single circumference. Thus, since the film-shaped strain gauges are equally influenced by the external force around the Z-axis, the torque sensor 1 is advantageous in order to precisely detect torque.

Furthermore, in the torque sensor 1, the pins 132 and the screws 133 with each of which the first plate-like member 10 is fastened to the second plate-like member 20 are also disposed at regular intervals on the circumference whose center corresponds to the center O. Thus, since an influence of strain, caused by these fastening tools, on the torque sensor 1 that is subjected to the external force around the Z-axis is circumferentially equalized, the torque sensor 1 is advantageous in order to precisely detect torque.

Moreover, in the torque sensor 1, the screws 131 with which the first plate-like member 10 is to be fixed to the robot arm 110 and the screws 134 with which the robot hand 120 is to be fixed to the second plate-like member 20 are also disposed at regular intervals on the circumference whose center corresponds to the center O. Thus, since an influence of strain, caused by these fixing tools, on the torque sensor 1 that is subjected to the external force around the Z-axis is circumferentially equalized, the torque sensor 1 is advantageous in order to precisely detect torque.

Further, in the torque sensor 1, the screws 134 with which the robot hand 120 is to be fixed to the second plate-like member 20 are disposed on the circumference having a smaller diameter than the circumference whose center corresponds to the center O and on which the film-shaped strain gauges 51A, 51B, and 51C are disposed. Furthermore, the screw 134 are disposed on the circumference having a smaller diameter than the circumference whose center corresponds to the center O and on which the pins 132 and the screws 133 with each of which the first plate-like member is fastened to the second plate-like member 20. Thus, the torque sensor 1 includes a structure in which the first plate-like member 10 and the second plate-like member 20 are fixed on an outer side in a radial direction of the torque sensor 1, and the robot hand 120, which is to be subjected to detection of strain, is fixed on an inner side in the radial direction of the torque sensor 1, so that the strain is detected. Thus, the torque sensor 1, which makes it easier to detect torque to be detected, is advantageous in order to detect torque with higher sensitivity.

In the torque sensor 1, the foregoing communication parts (the recesses, the annular part, and the contact part) are sealed by the sealing material 70. Thus, the torque sensor 1 has higher moisture resistance, higher water resistance, higher waterproofness, and higher dustproofness. This is advantageous in order to allow the torque sensor 1 to be more reliable.

As illustrated in, for example, FIGS. 3 and 4, the torque sensor 1 has an annular shape having the through hole 60 at a center of the planar shape. Thus, strain easily occurs, and thus the torque sensor 1 has good sensitivity.

The first plate-like member 10 and the second plate-like member 20 of the torque sensor 1 can be produced by common processing such as excavation of a groove, drilling of a hole, and printing of an electric material.

The torque sensor 1 is advantageous from the viewpoint of miniaturization and thinning, and also makes it possible to variously set resolution. Thus, the torque sensor 1 is advantageous for application to an existing robot and is expected to be highly versatile.

The robot 100 that includes the robot arm 110, the torque sensor 1 fixed to the robot arm 110, and the robot hand 120 fixed to the torque sensor 1 thus makes it possible to detect, with a desired range of resolution, torque applied by the robot hand 120.

[Variation]

A torque sensor in accordance with an aspect of the present invention may have a configuration other than the configuration described earlier, provided that an effect of the present invention is obtained. For example, the first plate-like member may be fastened to the second plate-like member by bonding by an adhesive.

The torque sensor has a shape that need not be an annular shape but may be, for example, a disk shape.

The spacer may be integrated with the first plate-like member as described earlier or may be integrated with the second plate-like member.

The material property of the first plate-like member may be identical to or different from the material property of the second plate-like member. In particular, in a case where the material property of the first plate-like member is different from the material property of the second plate-like member, a range of resolution of the torque sensor can be adjusted from general use to high resolution use in accordance with a combination of the material property of the first plate-like member and the material property of the second plate-like member. To the material of the plate-like member, not only a metal such as stainless steel (listed earlier) but also a resin is applicable.

The number of film-shaped strain gauges can be determined as appropriate in accordance with a use and desired accuracy. For example, in a case where a film-shaped strain gauge is used to detect merely presence/absence of an external force, the number of film-shaped strain gauges may be one or two. In a case where an external force other than the external force around the Z-axis is to be further detected, the number of film-shaped strain gauges may be not less than 4.

The recesses, the annular part, and the contact part of the groove of the first plate-like member may have respective different depths. For example, each of the layers of the printed wire has a thickness of approximately several microns, and the printed wire has a smaller thickness than the flexible substrate. Thus, the contact part may be formed deeper than the recesses and the annular part.

The torque sensor may be configured to have a recess that is open on a wall around the through hole 60, and may be configured to allow the sealing material to be injected into the recesses and the communication part through an opening in the recess in the through hole 60.

The above-described configuration not only allows the torque sensor to be more reliable, but also enables miniaturization and free setting of resolution. The present invention as described above is expected to contribute to promotion of further use of a torque sensor, for example, is expected to contribute to achievement of Goal 9 "Build resilient infrastructure, promote inclusive and sustainable industrialization and foster innovation" of Sustainable Development Goals (SDGs) proposed by the United Nations.

The present invention is not limited to the above embodiments, but can be altered in various ways within the scope of the claims. The present invention also encompasses, in its technical scope, any embodiment derived by appropriately combining technical means disclosed in differing embodiments.

The invention claimed is:

1. A torque sensor comprising:

a first plate-like member;

a second plate-like member that is opposed to the first plate-like member; and a spacer that is integrated with the first plate-like member and that is fastened to the second plate-like member, the spacer being plate-like, wherein a recess is provided on an outer edge of the spacer, and at least one film-shaped strain gauge disposed in the recess and a film-shaped wire connected to the at least one film-shaped strain gauge are provided in an outer circumferential region of a main surface of the second plate-like member, the main surface being opposed to the first plate-like member, the outer circumferential region protruding from the spacer.

2. The torque sensor as set forth in claim 1, wherein the recess is filled with a sealing material for sealing the at least one film-shaped strain gauge.

3. The torque sensor as set forth in claim 1, wherein the torque sensor includes a communication part that causes the recess to communicate with an outside on a lateral side of the torque sensor, the communication part includes a contact part that is open on a side surface of the torque sensor, and the film-shaped wire is disposed in the communication part.

4. The torque sensor as set forth in claim 1, wherein the at least one film-shaped strain gauge and a fastening tool for fastening the spacer to the second plate-like member are each disposed on a circumference having a specific center.

5. The torque sensor as set forth in claim 4, wherein the at least one film-shaped strain gauge comprises a plurality of film-shaped strain gauges, and the plurality of film-shaped strain gauges are disposed at regular intervals on the circumference.

6. A robot comprising:

a robot arm;

a torque sensor recited in claim 1, the torque sensor being fixed to the robot arm; and a robot hand fixed to the torque sensor.

* * * * *